US012122249B2

(12) United States Patent
Wiegman

(10) Patent No.: US 12,122,249 B2
(45) Date of Patent: Oct. 22, 2024

(54) SYSTEMS AND METHODS FOR RESTRICTING POWER TO A LOAD TO PREVENT ENGAGING CIRCUIT PROTECTION DEVICE FOR AN AIRCRAFT

(71) Applicant: BETA AIR, LLC, South Burlington, VT (US)

(72) Inventor: Herman Wiegman, Essex Junction, VT (US)

(73) Assignee: BETA AIR, LLC, South Burlington, VT (US)

( * ) Notice: Subject to any disclaimer, the term of this patent is extended or adjusted under 35 U.S.C. 154(b) by 40 days.

(21) Appl. No.: 17/948,344

(22) Filed: Sep. 20, 2022

(65) Prior Publication Data

US 2023/0016787 A1 Jan. 19, 2023

Related U.S. Application Data

(63) Continuation of application No. 17/348,137, filed on Jun. 15, 2021, now Pat. No. 11,491,878, which is a (Continued)

(51) Int. Cl.
| | |
|---|---|
| *B60L 3/00* | (2019.01) |
| *B60L 50/50* | (2019.01) |
| *B64C 29/00* | (2006.01) |
| *B64D 27/24* | (2006.01) |
| *H02J 4/00* | (2006.01) |
| *B60L 50/00* | (2019.01) |
| *H02H 7/20* | (2006.01) |

(52) U.S. Cl.
CPC ............ *B60L 3/0046* (2013.01); *B60L 50/50* (2019.02); *B64C 29/0008* (2013.01);
(Continued)

(58) Field of Classification Search
CPC ........ B60L 3/0046; B60L 50/00; B60L 50/50; B60L 2200/10; B64C 29/0008;
(Continued)

(56) References Cited

U.S. PATENT DOCUMENTS

| | | | |
|---|---|---|---|
| 6,921,987 B2 * | 7/2005 | Marin-Martinod | ......................... B64D 11/0624 307/29 |
| 2009/0152942 A1 * | 6/2009 | Waite | ....................... H02J 1/14 307/9.1 |

(Continued)

*Primary Examiner* — Levi Gannon
(74) *Attorney, Agent, or Firm* — Lee & Hayes, P.C.

(57) ABSTRACT

A system for restricting power to a load to prevent engaging a circuit protection device for an electric aircraft includes an energy source. The energy source is communicatively coupled to a load, wherein the load includes a portion of a propulsion system. The system includes sensors configured to sense an electrical parameter. The system includes an aircraft controller communicatively connected to the energy source, wherein the aircraft controller is configured to receive an electrical parameter, compare the electrical parameter to a current allocation threshold, detect that the electrical parameter has reached a current allocation threshold, calculate a power reduction to the load, generate a current allocation threshold notification as a function of the detection, wherein the current allocation threshold notification indicates that the electrical parameter has reached the current allocation threshold. The system includes an electrical circuit including a circuit protection device communicatively connected to the aircraft controller.

18 Claims, 9 Drawing Sheets

Related U.S. Application Data continuation-in-part of application No. 17/179,522, filed on Feb. 19, 2021, now Pat. No. 11,338,684, which is a continuation of application No. 16/590,496, filed on Oct. 2, 2019, now Pat. No. 10,953,754.

(60) Provisional application No. 62/896,184, filed on Sep. 5, 2019.

(52) U.S. Cl.
CPC ............... B64D 27/24 (2013.01); H02J 4/00 (2013.01); *B60L 50/00* (2019.02); *B60L 2200/10* (2013.01); *B64D 2221/00* (2013.01); *H02H 7/20* (2013.01)

(58) Field of Classification Search
CPC ...... B64D 41/00; B64D 2221/00; H02H 3/08; H02H 3/087; H02H 3/20; H02H 3/202; H02H 7/20; H02H 9/02; H02H 9/04; H02J 4/00
See application file for complete search history.

(56) References Cited

U.S. PATENT DOCUMENTS

| | | | |
|---|---|---|---|
| 2012/0232728 A1* | 9/2012 | Karimi | H02J 3/38 180/65.265 |
| 2016/0236790 A1* | 8/2016 | Knapp | B64C 11/44 |
| 2018/0061247 A1* | 3/2018 | Brown | G08G 5/0069 |

* cited by examiner

SYSTEMS AND METHODS FOR RESTRICTING POWER TO A LOAD TO PREVENT ENGAGING CIRCUIT PROTECTION DEVICE FOR AN AIRCRAFT

CROSS-REFERENCE TO RELATED APPLICATIONS

This application is a continuation of U.S. patent application Ser. No. 17/348,137, filed on Jun. 15, 2021, and entitled, "SYSTEMS AND METHODS FOR RESTRICTING POWER TO A LOAD TO PREVENT ENGAGING CIRCUIT PROTECTION DEVICE FOR AN AIRCRAFT," which is a continuation-in-part of U.S. patent application Ser. No. 17/179,522 filed on Feb. 19, 2021 and entitled, "SYSTEMS AND METHODS FOR RESTRICTING POWER TO A LOAD TO PREVENT ENGAGING CIRCUIT PROTECTION DEVICE FOR AN AIRCRAFT," which is a continuation of U.S. Nonprovisional application Ser. No. 16/590,496 filed on Oct. 2, 2019, and entitled, "SYSTEMS AND METHODS FOR ALLOCATING POWER TO A LOAD TO PREVENT ENGAGING CIRCUIT DEVICE PROTECTION", which claims the benefit of priority of U.S. Provisional Patent Application Ser. No. 62/896,184, filed on Sep. 5, 2019, and titled "SYSTEMS AND METHODS FOR ALLOCATING POWER TO A LOAD TO PREVENT ENGAGING CIRCUIT DEVICE PROTECTION," each of which are incorporated by reference herein in their entirety.

FIELD OF THE INVENTION

The present invention generally relates to the field of current allocation in an electric aircraft. In particular, the present invention is directed to systems and methods for restricting power to a load to prevent engaging circuit protection device for an aircraft.

BACKGROUND

During flight, an electric aircraft will utilize energy and power from an onboard energy source. Multiple loads may cause significant stress on the energy source, which may cause a circuit protection device to be engaged to protect the whole electrical power system from overload currents, or other damaging events. Engaging a circuit protection device can result in a loss of electrical feed to a critical aircraft component by disconnecting an energy source, leading to detrimental safety and aircraft functionality concerns. Historically, the means of protecting a circuit protection device have varying levels of efficiency, reusability, weight, and require external control. The need for a means of minimizing a circuit protection device from engaging and causing electrical faults to the subsequent subsystems may be met by restricting power to a load to prevent engaging a circuit protection device for an aircraft. The latter solution can be particularly attractive when an electric aircraft has a constant, intermittent, or occasional need for rotor-based flight, such as may be the case for an aircraft that takes off and/or lands vertically or may need to hover at certain points in the aircraft's flight.

SUMMARY OF THE DISCLOSURE

In one aspect, a system for allocating power to a load, the system including at least an energy source of an electric aircraft, wherein the at least an energy source is communicatively coupled to at least a load, at least a sensor, wherein the at least a sensor is configured to detect an electrical parameter of the at least an energy source, and a controller. The controller is configured to receive the electrical parameter of the at least an energy source from the at least a sensor, determine a power demand for a particular phase of flight, calculate a power allocation threshold, wherein the power allocation threshold is a function of a circuit protection threshold, compare the power demand to the power allocation threshold, and calculate a power reduction to the at least a load as a function of the comparison.

In another aspect, a method for allocating power to a load, the method including detecting, by at least a sensor, an electrical parameter of at least an energy source of an electric aircraft, wherein the at least an energy source is communicatively coupled to at least a load. The method further including receiving, at a controller, the electrical parameter of the at least an energy source from the at least a sensor. The method further including determining, at the controller, a power demand for a particular phase of flight. The method further including calculating, at the controller, a power allocation threshold wherein the power allocation threshold is a function of a circuit protection threshold. The method further including comparing, at the controller, the power demand to the power allocation threshold. The method further including calculating, at the controller, a power reduction to the at least a load as a function of the comparison.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 2. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

At a high level, aspects of the present disclosure are directed to systems and methods for restricting the power output to a load to prevent engaging a circuit protection device. Systems for restricting the power output to a load to prevent engaging a circuit protection device in an aircraft may be integrated into any aircraft, electric aircraft, and/or any vertical takeoff and landing aircraft. In an embodiment, a vehicle controller in an electric aircraft will reduce power output to a load, such as a propulsor, if an electrical parameter threatens to reach a threshold which will engage a circuit protection device. Engaging a circuit protection device will disconnect power to critical functions during flight. This novel system may result in, a reduced the risk of engaging the circuit protection device to ensure at least partial power operation for the remaining phases of flight, wherein the plurality of electrical circuits remain functional for the entirety of the flight plan, flight path, and/or remaining phases.

Figure 1:
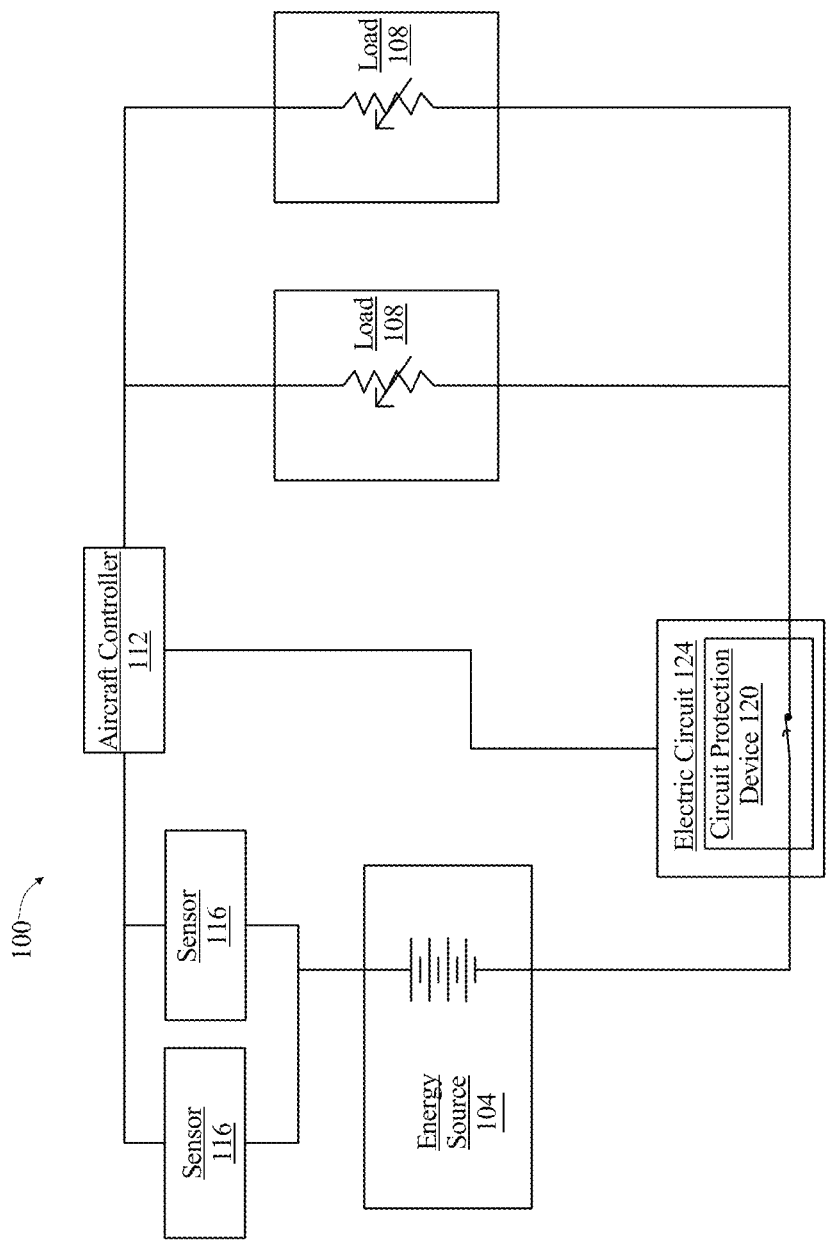
FIG. 1 is a high-level block diagram illustrating an exemplary embodiment of a circuit diagram within an electric power system.

Referring now to the drawings, FIG. 1 illustrates an exemplary embodiment of a system 100 for restricting power to a load to prevent engaging circuit protection device for an aircraft. System 100 for restricting power to a load to prevent engaging circuit protection device for an aircraft includes at least an energy source 104, wherein energy source 104 is driving a plurality of (or at least one) controllable loads 108. At least an energy source 104 may comprise a plurality of energy sources. An energy source of a plurality of energy sources 104 may include, without limitation, a generator, a photovoltaic device, a fuel cell such as a hydrogen fuel cell, direct methanol fuel cell, and/or solid oxide fuel cell, or an electric energy storage device; electric energy storage device may include without limitation a capacitor, an inductor, an energy storage cell and/or a battery. At least an energy source 104 may include a battery cell or a plurality of battery cells connected in series into a module; each module may be connected in series or in parallel with other modules. Configuration of at least an energy source 104 containing connected modules may be designed to meet an energy or power requirement and may be designed to fit within a designated footprint in an electric aircraft in which system 100 may be incorporated. At least an energy source 104 may be used to provide a steady supply of electrical power to a load over the course of a flight by a vehicle or other electric aircraft; the at least an energy source may be capable of providing sufficient power for "cruising" and other relatively low-energy phases of flight. An energy source 104 may be capable of providing electrical power for some higher-power phases of flight as well. At least an energy source of 104 may be capable of providing sufficient electrical power for auxiliary loads, including without limitation lighting, navigation, communications, de-icing, steering or other systems requiring power or energy. At least an energy source 104 may be capable of providing sufficient power for controlled descent and landing protocols, including without limitation hovering descent or conventional runway landing.

Still referring to FIG. 1, at least an energy source 104 may include a device for which power that may be produced per unit of volume and/or mass has been optimized, at the expense of the maximal total specific energy density or power capacity, during design. Non-limiting examples of items that may be used as at least an energy source 104 may include batteries used for starting applications including Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon, tin nanocrystals, graphite, graphene or titanate anode, or the like. Batteries may include without limitation batteries using nickel-based chemistries such as nickel cadmium or nickel metal hydride, batteries using lithium-ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), batteries using lithium polymer technology, metal-air batteries. At least an energy source 104 may include lead-based batteries such as without limitation lead acid batteries and lead carbon batteries. At least an energy source 104 may include lithium sulfur batteries, magnesium ion batteries, and/or sodium ion batteries. Batteries may include solid state batteries or supercapacitors or another suitable energy source. Batteries may be primary or secondary or a combination of both. Persons skilled in the art, upon reviewing the entirety of this disclosure, will be aware of various devices of components that may be used as at least energy source 104. At least an energy source 104 may be used, in an embodiment, to provide electrical power to an electric aircraft or drone, such as an electric aircraft vehicle, during moments requiring high rates of power output, including without limitation takeoff, landing, thermal de-icing and situations requiring greater power output for reasons of stability, such as high turbulence situations, as described in further detail below.

Still referring to FIG. 1, in an embodiment, at least an energy source 104 may be used to provide a steady supply of electrical power to a critical functions over the course of a flight by an electronic vertical takeoff and landing (eV-TOL) vehicle, defined as an electronic vehicle that can take off or land in a vertical or near vertical trajectory, such as rotor-based "hover" takeoff and landing, or the like, or other electric aircraft; the at least an energy source 104 may be capable of providing sufficient power for "cruising" and other relatively low-energy phases of flight. At least an energy source 104 may be capable of providing electrical power for some higher-power phases of flight as well, particularly when high specific energy density energy source is at a high state of charge, as may be the case for instance during takeoff. At least an energy source 104 may be capable of providing sufficient electrical power for auxiliary loads including without limitation, lighting, navigation, communications, de-icing, steering or other systems requiring power or energy. Persons skilled in the art will be aware, after reviewing the entirety of this disclosure, of many different potential components of at least an energy source 104, of a plurality of energy sources.

Continuing to refer to FIG. 1, at least an energy source 104 may supply power to a plurality of critical functions in the aircraft. Critical functions in the aircraft may include, without limitation, communications, flight control, lighting, emergency lighting, heating, navigation, de-icing, steering cruising, landing and descents. Critical functions refer to functions is requisite for safe operation on the aircraft. Critical functions may need to be in operation at all times during flight, even in emergency situations. Noncritical functions have no effect on the safe flight of the aircraft during various phases of flight. These functions can be firstly shed when any reduction in power from the energy source is necessary or there is an emergency situation where power and energy must be allocated elsewhere. High peak loads may be necessary to perform certain landing protocols which may include, but are not limited to, hovering descent or runway descents. During landing, propulsors may demand a higher power than cruising as required to descend in a controlled manner. High peak loads may be necessary to perform certain landing protocols which may include, but are not limited to, hovering descent or runway descents. During landing, propulsors may demand a higher power than cruising as required to descend in a controlled manner.

Continuing to refer to FIG. 1, at least an energy source 104 is electrically connected to a plurality of loads 108. Plurality of loads 108 may include any device or component that consumes electrical power. Plurality of loads 108 may include one or more propulsive devices, including without limitation one or more propellers, turbines, impellers, or other devices for propulsion during flight. Plurality of loads 108 may be, without limitation, in the form of a plurality of propulsive devices. A propulsive device, as described herein, is a component or device used to propel a craft by exerting force on a fluid medium, which may include a gaseous medium such as air or a liquid medium such as water. A propulsive device, as described herein, may include, without limitation, at least a thrust element. At least a thrust element may include any device or component that converts the mechanical energy of a motor, for instance in the form of rotational motion of a shaft, into thrust in a fluid medium. At least a thrust element may include, without limitation, a device using moving or rotating foils, including without limitation one or more rotors, an airscrew or propeller, a set of airscrews or propellers such as contra-rotating propellers, a moving or flapping wing, or the like. At least a thrust element may include without limitation a marine propeller or screw, an impeller, a turbine, a pump-jet, a paddle or paddle-based device, or the like.

With continued reference to FIG. 1, plurality of loads 108 may convert electrical energy into kinetic energy; for instance, first plurality of loads 108 may include one or more electric motors. An electric motor, as described herein, is a device that converts electrical energy into mechanical energy, for instance by causing a shaft to rotate. An electric motor may be driven by direct current (DC) electric power. As an example and without limitation, an electric motor may include a brushed DC electric motor or the like. An electric motor may be, without limitation, driven by electric power having varying or reversing voltage levels, such as alternating current (AC) power as produced by an alternating current generator and/or inverter, or otherwise varying power, such as produced by a switching power source. An electric motor may include, for example and without limitation, brushless DC electric motors, permanent magnet synchronous an electric motor, switched reluctance motors, or induction motors. In addition to inverter and/or a switching power source, a circuit driving an electric motor may include electronic speed controllers (not shown) or other components for regulating motor speed, rotation direction, and/or dynamic braking.

Still referring to FIG. 1, the plurality of loads 108 may, for example and without limitation, convert electrical energy into heat. As a further example and without limitation, plurality of loads 108 may include resistive loads. As another non-limiting example, plurality of loads 108 may convert electrical energy into light. Plurality of loads 108 may include one or more elements of digital or analog circuitry. For example and without limitation, plurality of loads 108 may consume power in the form of voltage sources to provide a digital circuit's high and low voltage threshold levels, to enable amplification by providing "rail" voltages, or the like. Plurality of loads 108 may include, as a non-limiting example, control circuits, aircraft controllers and/or flight controllers as described in further detail below. At least an energy source 104 may connect to a first load of plurality of loads 108 using an electrical connection enabling electrical or electromagnetic power transmission, including any conductive path from high specific energy density energy source device to first load, any inductive, optical or other power coupling such as an isolated power coupling, or any other device or connection usable to convey electrical energy from an electrical power, voltage, or current source. The electrical connection may include, without limitation, a distribution bus. Persons skilled in the art, upon reviewing the entirety of this disclosure, will be aware of various devices that may be used as at least the plurality of loads 108.

With continuing reference to FIG. 1, system 100 includes at least an aircraft controller 112. Aircraft controller 112 may include and/or communicate with any computing device as described in this disclosure, including without limitation a microcontroller, microprocessor, digital signal processor (DSP) and/or system on a chip (SoC) as described in this disclosure. Aircraft controller 112 may be installed in an aircraft, may control the aircraft remotely, and/or may include an element installed in the aircraft and a remote element in communication therewith. Aircraft controller 112 may include, be included in, and/or communicate with a mobile device such as a mobile telephone or smartphone. Aircraft controller 112 may include a single computing device operating independently, or may include two or more computing device operating in concert, in parallel, sequentially or the like; two or more computing devices may be included together in a single computing device or in two or more computing devices. Aircraft controller 112 with one or more additional devices as described below in further detail via a network interface device. Network interface device may be utilized for connecting an aircraft controller 112 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Aircraft controller 112 may include but is not limited to, for example, an aircraft controller 112 or cluster of computing devices in a first location and a second computing device or cluster of computing devices in a second location. Aircraft controller 112 may include one or more computing devices dedicated to data storage, security, distribution of traffic for load balancing, and the like. Aircraft controller 112 may distribute one or more computing tasks as described below across a plurality of computing devices of computing device, which may operate in parallel, in series, redundantly, or in any other manner used for distribution of tasks or memory between computing devices. Aircraft controller 112 may be implemented using a "shared nothing" architecture in which data is cached at the worker, in an embodiment, this may enable scalability of system 100 and/or computing device.

Still referring to FIG. 1, at least an aircraft controller 112 is in communication with the at least an energy source 104 of a plurality of energy sources and the at least a load 108 of the plurality of loads. At least an aircraft controller 112 may be communicatively connected to the at least an energy source 104 of a plurality of energy sources and the at least a load 108 of the plurality of loads. As used herein, "communicatively connecting" is a process whereby one device, component, or circuit is able to receive data from and/or transmit data to another device, component, or circuit; communicative connection may be performed by wired or wireless electronic communication, either directly or by way of one or more intervening devices or components. In an embodiment, communicative connecting includes electrically coupling at least an output of one device, component, or circuit to at least an input of another device, component, or circuit. Communicative connecting may be performed via a bus or other facility for intercommunication between elements of a computing device as described in further detail below in reference to FIG. 9. Communicative connecting may include indirect connections via "wireless" connection, radio communication, low power wide area network, optical communication, magnetic, capacitive, or optical coupling, or the like. Aircraft controller 112 may include any computing device or combination of computing devices as described in detail below in reference to FIG. 9. Aircraft controller 112 may include any processor or combination of processors as described below in reference to FIG. 9. Aircraft controller 112 may include a microcontroller. Aircraft controller 112 may be incorporated in the electric aircraft or may be in remote contact.

Still referring to FIG. 1, aircraft controller 112 may be communicatively connected, as defined above, to each load 108 of plurality of loads; as used herein, aircraft controller 112 is communicatively connected to each load where aircraft controller 112 is able to transmit signals to each load and each load is configured to modify an aspect of load behavior in response to the signals. As a non-limiting example, aircraft controller 112 may transmit signals to load 108, of plurality of loads, via an electrical circuit connecting aircraft controller 112 to the load 108, of a plurality of loads. As an example and without limitation, the circuit may include a direct conductive path from aircraft controller 112 to load or may include an isolated coupling such as an optical or inductive coupling. Alternatively or additionally, aircraft controller 112 may communicate with load 108, of a plurality of loads, using wireless communication, such as without limitation communication performed using electromagnetic radiation including optical and/or radio communication, or communication via magnetic or capacitive coupling. Persons skilled in the art will be aware, after reviewing the entirety of this disclosure, of many different forms and protocols of communication that may be used to communicatively couple aircraft controller 112 to a load 108 of plurality of loads.

In an embodiment and still referring to FIG. 1, aircraft controller 112 may include a reconfigurable hardware platform. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform may be reconfigured to enact any algorithm and/or algorithm selection process received from another computing device and/or created using machine-learning and/or neural net processes as described below.

Still referring to FIG. 1, aircraft controller 112 may be communicatively connected to at least a sensor 116. Sensors, as described herein, are any device, module, and/or subsystems, utilizing any hardware, software, and/or any combination thereof to detect events and/or changes in the instant environment and communicate the information to the at least an aircraft controller. Sensors 116 may be used to monitor the status of the system of both critical and non-critical functions. At least a sensor 116 may be incorporated into vehicle or aircraft or be remote. As an example and without limitation, at least a sensor 116 may be configured to detect the at least an electrical parameter. Electrical parameters may include, without limitation, voltage, current, impedance, resistance, temperature. As an example and without limitation, current may be measured by using a sense resistor in series with the circuit and measuring the voltage drop across the resister, or any other suitable instrumentation and/or methods for detection and/or measurement of current. As a further example and without limitation, voltage may be measured using any suitable instrumentation or method for measurement of voltage, including methods for estimation as described in further detail below. Each of resistance, current, and voltage may alternatively or additionally be calculated using one or more relations between impedance and/or resistance, voltage, and current, for instantaneous, steady-state, variable, periodic, or other functions of voltage, current, resistance, and/or impedance, including without limitation Ohm's law and various other functions relating impedance, resistance, voltage, and current with regard to capacitance, inductance, and other circuit properties. Alternatively, or additionally, aircraft controller 112 may be wired to at least an energy source 104 via, for instance, a wired electrical connection. Measuring at least an electrical parameter may include calculating an electrical parameter based on other sensed electrical parameters, for instance by using Ohm's law to calculate resistance and/or impedance from detected voltage and current levels. Aircraft controller 112 may sense a temperature, environmental parameter, a location parameter, a barometric pressure, or other necessary measurement. Aircraft controller 112 may measure resistance across a circuit via direct method or by calculation. This may be accomplished, for instance, using an analog-to-digital converter, one or more comparators, or any other components usable to measure electrical parameters using an electrical connection that may occur to any person skilled in the art upon reviewing the entirety of this disclosure. Persons skilled in the art, upon reviewing the entirety of this disclosure, will be aware of various ways to monitor the status of the system of both critical and non-critical functions.

With continued reference to FIG. 1, aircraft controller 112 may be configured to receive at least an electrical parameter of a load 108 of the plurality of loads from each sensor 116 of the plurality of sensors. At least an electrical parameter of a load 108 is any electrical parameter, as described above. Aircraft controller 112 may be further configured to compare at least an electrical parameter to a current allocation threshold. Comparing may include, without limitation, periodic comparison, continuous comparison, and any combination thereof. Current allocation threshold may be the value at which the aircraft controller 112 will recalculate and redistribute power to the plurality of loads 108, for instance as set forth in the disclosure below. Current allocation threshold may be generated as a function of at least a circuit protection threshold; for instance and without limitation, the current allocation limit may be a set reduction, increase, percentage or other calculation method of the circuit detection limit. Current allocation threshold may include a current threshold, a voltage threshold, a resistance threshold, a temperature threshold, or the like. Current allocation threshold may be derived from in flight data, from manufacturer data, form integrator data, or the like. As a non-limiting example, where a circuit protection device threshold is at 20A, a corresponding load current allocation threshold limit may be set at 15 A. In another non-limiting example, when measuring voltage, a circuit under voltage protection device threshold may be set at 3V and a corresponding load under potential allocation threshold may be set at 4V. Continuously comparing may include, without limitation, periodic comparisons, such as comparisons performed every second, minute, another pre-determined time or any repeated measurement done at particular time intervals. As a further non-limiting example, aircraft controller 112 may also compare at a predetermined time, or in response to a condition which makes another measurement necessary. In an exemplary embodiment, and for the purposes of illustration, current levels may be measured every 6 milli-seconds until the measurements are within 0.5 A of a current allocation threshold limit at which time the current may be measured every 1 milli-second until the measurement reaches the current allocation threshold. Aircraft controller 112 may compare more than one electrical parameter to a threshold during the segment of flight. In an embodiment and without limitation, aircraft controller 112 may continuously measure current in an energy source 104 or in a plurality of loads 108. Aircraft controller 112 may continuously calculate a greater of a previous two measurements and compare to a graph or other mapping showing the measurements vs time and vs a threshold limit. In an embodiment and without limitation, aircraft controller 112 will compare the electrical parameter measurements to a current allocation threshold which is a fraction of the threshold limit which engages the circuit protection device.

Still referring to FIG. 1, aircraft controller 112 may be further configured to detect the at least an electrical parameter has reached the current allocation threshold may be performed by the controller, computer, remote device or by a person. Detection may, as an example and without limitation, be done by using a direct comparison to determine if the at least an electrical parameter has reached the current allocation threshold. For instance, detection may occur where controller 112 measures a current of 6 A and the current allocation threshold is 6 A. Detection may, as a further non-limiting example, involve the use of calculations or formulas to determine if the current allocation threshold is or has been reached. As another example and without limitation, detecting may be performed by graphing and/or mapping the at least an electrical parameter versus time to determine if the current allocation threshold is reached. Graphing and/or mapping may be coupled with an averaging algorithm if a momentarily high or low datum transiently exceeds current allocation threshold; low-pass filtering of at least an electrical parameter may alternatively or additionally be used to eliminate transient values from comparison. Graphing and/or mapping may be also be combined with a noise reducing algorithm to further process datum. As a further example and without limitation, detection may be performed by calculating a rate of change of at least an electrical parameter, for instance by taking multiple measurements and using differences between measurements to calculate or identify a rate or change. Rate of change of any electrical parameter may be used to calculate and/or predict future electrical parameters at a given or future point in time. Detection may, as a further example and without limitation, involve comparison to a reference chart or another calculation. In an embodiment, detection includes continuously comparing the first electrical parameter to a first current allocation threshold of the at least a current allocation threshold and continuously comparing a second electrical parameter to a second current allocation threshold.

Continuing to refer to FIG. 1, aircraft controller 112 may be further configured to calculate a power reduction to each load 108 of the plurality of loads. The power reduction calculated to at least a load includes using the current allocation threshold limit, the at least an electrical parameter which, in aggregate, will continue to keep the at least an electrical parameter that is sensed below the current allocation threshold. The power reduction calculation may include more than on electrical parameter, a comparison to a graph or other calculated data set, such as a table. In an embodiment, the current allocation calculation assuming a set percentage offset of the current allocation threshold and calculated the aggregate power demand of at least a plurality of loads 108. In another embodiment, aircraft controller 112 calculated a set reduction to each load, of at least a plurality of loads 108 and then calculated the aggregate and compares that value to the current allocation threshold.

Still referring to FIG. 1, the minimum power needed may be used to determine a power reduction for the phase of flight. The calculation may use manufacturing data or data collected by a plurality of sensors during flight. Using the minimum power demand for a particular phase of flight, aircraft controller 112 may determine the total power demand for the plurality of loads by using the power demand of an individual propulsor and multiplying that by the number of loads. In an embodiment and without limitation, aircraft controller 112 may determine if there is enough power in the plurality of energy sources to power the phase of flight and the rest of the flight plan. If there is enough power, aircraft controller 112 may continue to communicate the original flight plan. If there in not adequate power, aircraft controller 112 may reduce the power demand by restricting remaining power output of the plurality of energy sources to one or more motors connected to a propulsor of a plurality of propulsors by communications to the motor supplying power to the plurality of propulsors. As a further example and without limitation, aircraft controller 112 may perform a thrust and/or balance operation to determine if the balance of the aircraft, as a result of the reduced power levels, is operating in a safe range. As another example and without limitation, aircraft controller 112 may detect environmental parameters, using an environmental sensor, which may include, without limitation, wind speed, barometric pressure, humidity and air temperature. Aircraft controller 112 may use at least an environmental parameter to calculate power reduction. In an embodiment, the power reduction of electric aircraft 200 may be a function of the wind speed. The greater the wind speed in opposing the trajectory of electric aircraft 200, the greater the propulsor power needed.

With continued reference to FIG. 1, aircraft controller 112 is configured to generate a current allocation threshold notification as a function of the detection that the at least an electrical parameter has reached the current allocation threshold. Aircraft controller 112 may be similar to or the same as flight controller 504 as described herein. For the purposes of this disclosure, "current allocation threshold notification" is one or more elements of data generated as a function of the detection that at least an electrical parameter has reached a current allocation threshold and configured to notify a user, computing device, or combination thereof of the detection. In non-limiting examples, current allocation threshold allocation may include altering one or more components function in the herein described system. Altering one or more components function may increase, decrease, modulate, fluctuate, activate, deactivate, change a path of at least an electrical characteristic. Current allocation threshold notification may include transmitting, receiving, altering, conditioning, or otherwise communicating using electrical signals such as any flight component, any portion of any controller, computing device, chip, located locally or remotely, or another nondisclosed electrical component. Current allocation threshold notification may be communicated to any of the components as described herein by any controller, flight controller, or computing device as described herein. current allocation threshold notification notifies the user of the at least an electrical parameter reaching the current allocation threshold. Notification to the user by the current allocation threshold notification may be in any form of communication as described herein such as through visual cues, heads-up displays, visors, goggles, projections, holograms, videos, pictures, graphical representations of data such as voltage over time, audio cues such as dings, chimes, bells, robotic voice recordings, prerecorded audio warning messages, tones, alarms, or the like. Notification to the user by current allocation threshold notification may include haptic feedback such as vibrations, jostling of controls, resistance to control inputs, or the like, in non-limiting embodiments. Notification to the user by current allocation threshold notification may be configured to prompt the user for an interaction such as an approval, denial, adjustment, or other manipulation of a command, such as a command to adjust one or more electrical parameters or outputs of other components within system 100 such as propulsor 108 or energy source 104 to name a few consistent with the entirety of this disclosure. Controller 112 may adjust power output from the at least a plurality of energy sources in response to an interaction with current allocation threshold notification by the user such as a voice, haptic, or gesture interaction. It should be noted by one of ordinary skill in the art that system 100 may be configured to adjust power output autonomously and without initiation or intervention from the user regardless of current allocation threshold notification notifying the user. That is to say that in an exemplary embodiment, current allocation threshold notification displays the power levels or compromised energy source to the user, and controller 112 then adjusts power output in response to the detection of the compromised energy source 104. In another exemplary embodiment, controller 112 may be configured to adjust power output from energy source 104 after current allocation threshold notification displays and prompts the user for an interaction and receives the interaction with current allocation threshold notification.

With continued reference to FIG. 1, current allocation threshold notification may include notification unit. Notification unit may include a graphical user interface (GUI). For the purposes of this disclosure, a "graphical user interface" is a device configured to present data or information in a visual manner to a user, computer, camera or combination thereof. Notification unit may be configured to display information regarding energy source. Notification unit may be configured to display information regarding a compromised energy source such as during a certain state of charge, when a threshold charge value is reached or approached, electrical parameters associated with the function of energy source, capability of the compromised energy source, or the like. Notification unit may prompt a user for an interaction. Notification unit may be configured to receive haptic, audio, visual, gesture, passkey, or other type of interaction from a user. Notification unit may perform one or more functions in response to the interaction from a user. In non-limiting examples, and without limitation, notification unit may transmit a signal to controller 112 when an affirmative interaction is received from the user, the signal indicating to transmit one or more signals to other components communicatively connected thereto, such as propulsor. Notification unit may operate completely outside the communication between controller 112 and any other component communicatively connected thereto. For example and without limitation, notification unit may indicate to the user that energy source has a certain level of charge and system 100 may operate autonomously to adjust one or more electrical commands regardless of the notification to the user.

Still referring to FIG. 1, current allocation threshold notification may include an interaction with any user as described herein. Current allocation threshold notification may include displaying the current allocation threshold notification in a graphical user interface (GUI). Current allocation threshold notification may include an approval by the user, denial by the user, accepting an automated suggestion by the user, displaying the current allocation threshold notification to the user, such as with a GUI as described herein. Current allocation threshold notification may be communicated to one or more users remotely located or onboard the aircraft. Current allocation threshold notification may be voted on by one or more users, one or more computing devices or portions thereof, a combination thereof, or one or more other parties granted voting privileges by one or more of the systems described herein, in a nonlimiting embodiment. Current allocation threshold notification may be suggested to the user visually, audially, haptically, a combination thereof, or another form of notification to a user. Current allocation threshold notification may be interacted with visually, audially, haptically, or otherwise to indicate accepting, denying, or adjusting to the suggested power production command datum. In non-limiting embodiments, current allocation threshold notification may be configured to command any one or more flight elements, chipset components, flight components, energy sources, propulsors, loads, sensors, GUIs, controllers, flight controllers, sub-controllers, co-controllers, autonomous functions, semi-autonomous functions or modes, and/or non-autonomous functions or modes as described herein. Current allocation threshold notification may be configured to alter the function of any of the above-described systems as described herein.

With continuing reference to FIG. 1, aircraft controller 112 may further include reducing power from the at least an energy source to each load 108 of the plurality of loads by the power reduction. Reducing power from the at least an energy source 104 to each load of the plurality of loads may include disconnecting the communication between the at least an energy source 104 and the at least an electrical circuit 124. Reducing power from the at least an energy source 104 to each load of the plurality of loads may further include reconnecting the communication between the at least an energy source 104 and the at least an electrical circuit 124. Reducing power from the at least an energy source 104 to each load of the plurality of loads may further include preventing communication between the at least an energy source 104 and the at least an electrical circuit 124. In an embodiment and without limitation, aircraft controller 112 may direct a power reduction to a load 108, of a plurality of loads of an electric aircraft. As a further example and without limitation, aircraft controller 112 may direct the aircraft to change to a flight trajectory which requires reduced power demands. Aircraft controller 112 may generate and/or store a number of predetermined flight trajectories. As another example and without limitation, aircraft controller 112 may calculate and/or store a range of suitable flight trajectories ranked by power demand for a particular flight phase or for the entire flight phase, or both. As a further non-limiting example, aircraft controller 112 may select a top ranked flight trajectory for phase of flight or the entire flight. As another example and without limitation, aircraft controller 112 may select a different flight trajectory for each flight phase. Aircraft controller 112 may, as a non-limiting example, select more than one flight trajectory and communicate to a remote device or person for consideration. One or more flight trajectories may include a combination of geospatial coordinates, a series of waypoints, altitude assignments, and/or time assignments. One or more flight trajectories may include, without limitation, a straight flight course occurring at the same altitude, a spiral flight course which includes turns, a combination of both or a reduction in altitude. In an embodiment and without limitation, aircraft controller 112 may reduce one or more propulsors to operate at a reduced power level that make the aircraft unbalanced and operate in a corkscrew pattern to cruise and or land safely.

With continued reference to FIG. 1, system 100 includes at least an electrical circuit 124. Electrical circuit 124 may be communicatively connected to aircraft controller 112, each load 108 of the plurality of loads, and/or each energy source 104 of the plurality of energy sources. Electrical circuit, as described herein, are any device, module, and/or subsystems, utilizing any hardware, software, and/or any combination thereof to form a path in which electrons from a voltage or current source flow. Electrical circuit 124 may include, without limitation, a series circuit, a parallel circuit, or any combination thereof. Electrical circuit 124 may function to facilitate the electrical flow from each energy source 104 of the plurality of energy sources to each load 108 of the plurality of loads.

Referring still to FIG. 1, circuit protection device 120 is incorporated into electrical circuit 124 in system 100. Circuit protection device 120 may be communicatively connected to aircraft controller 112. Circuit protection device 120 may be a device that protects electrical circuit 124 from different electrical faults such as over current and overload. Circuit protection device 120 may function to break or interrupt electrical flow in a circuit in response to at least an electrical parameter which is reaching a predetermined threshold where a limit may pose a serious threat to the integrity of the circuit or of any component or device connected to or incorporated in the circuit. Circuit protection device 120 may interrupt the circuit by tripping open a part of a circuit, which interrupts the current flow. Circuit protection device 120 may be used to minimize distress to the electrical system and hazard to system, an electric aircraft as disclosed below, passengers, and surrounding aircraft in the event of wiring faults or serious malfunctions of the system or connected equipment. As the current measured reaches a current threshold limit, aircraft controller 112 may engage the circuit protection device 120 to stop current flow to reduce the risk of damage to the propulsor, wires, energy source 104 and surrounding equipment in an electric aircraft.

Continuing to refer to FIG. 1, circuit protective device 120 may include, without limitation, an overload relay which is designed to interrupt the flow of current in an electric circuit upon the detection of undesirable current levels over a period of time; such current levels may lead to serious damage to a motor or other equipment when there is excessive heating of the motor windings. Upon detection of an overload condition, overload relay may output a trip command to a circuit opening mechanism such as a contractor, which may disconnect a load of plurality of loads 108 from at least an energy source 104. Circuit protection device 120 may include, as an example and without limitation, an overload relay of a thermal type, which may include a heater element which may heat a metallic or bimetallic strip, when the load current flows through, to deform that strip enough to force a contact open.

Still referring to FIG. 1, circuit protective device 120 may include, without limitation, a fuse. A fuse may be a base element of a circuit protection device including a small conductive material with low resistance that is placed within a circuit; when a current flowing through circuit and/or fuse exceeds a permitted value, which may be due to an overload, short circuit or load mismatch, the excessive current may melt or otherwise damage the conductive material in the fuse and open the circuit. Various materials may be used as a fusible element which include, without limitation, tin, lead silver, bismuth, and other alloys of these materials. Circuit protection device 120, of a plurality of circuit protection devices, may include, without limitation, a current limiter, defined as a device limiting current to a defined value. Circuit protection device 120 may include, without limitation, a limiting resistor. Limiting resistors may be used to protect electrical circuits, including DC, pulse and AC circuits, for instance in situations where starting/initial current is very high, for example starter engine.

With continued reference to FIG. 1, circuit protection device 120 may further include, as a non-limiting example, a circuit breaker. Circuit breakers may differ from fuses and current limiters in that they may include electromechanical devices that interrupt and isolate circuit in case of failure; the working principle may include actuation of the electromechanical device by heating of bimetallic element through which current passes to the switch unit, or by any other suitable trigger. Circuit protection device 120 may further include, without limitation, a solid-state power controller (SSPC) which may be a semiconductor device that controls power in the form of power, voltage, and/or current which are supplied to a load; such devices may perform supervisory and diagnostic functions in order to identify overload conditions and prevent short circuits. Circuit protection device 120 may include, as a further non-limiting example, a secondary back up protection device, which may include a fuse as described above. For instance, and without limitation, dual-element (two-element) fuse or time delay fuses may provide secondary overload protection. Accordingly, for an example and without limitation, such a fuse may represent a secondary failure and be intended to prevent further operation.

Figure 2:
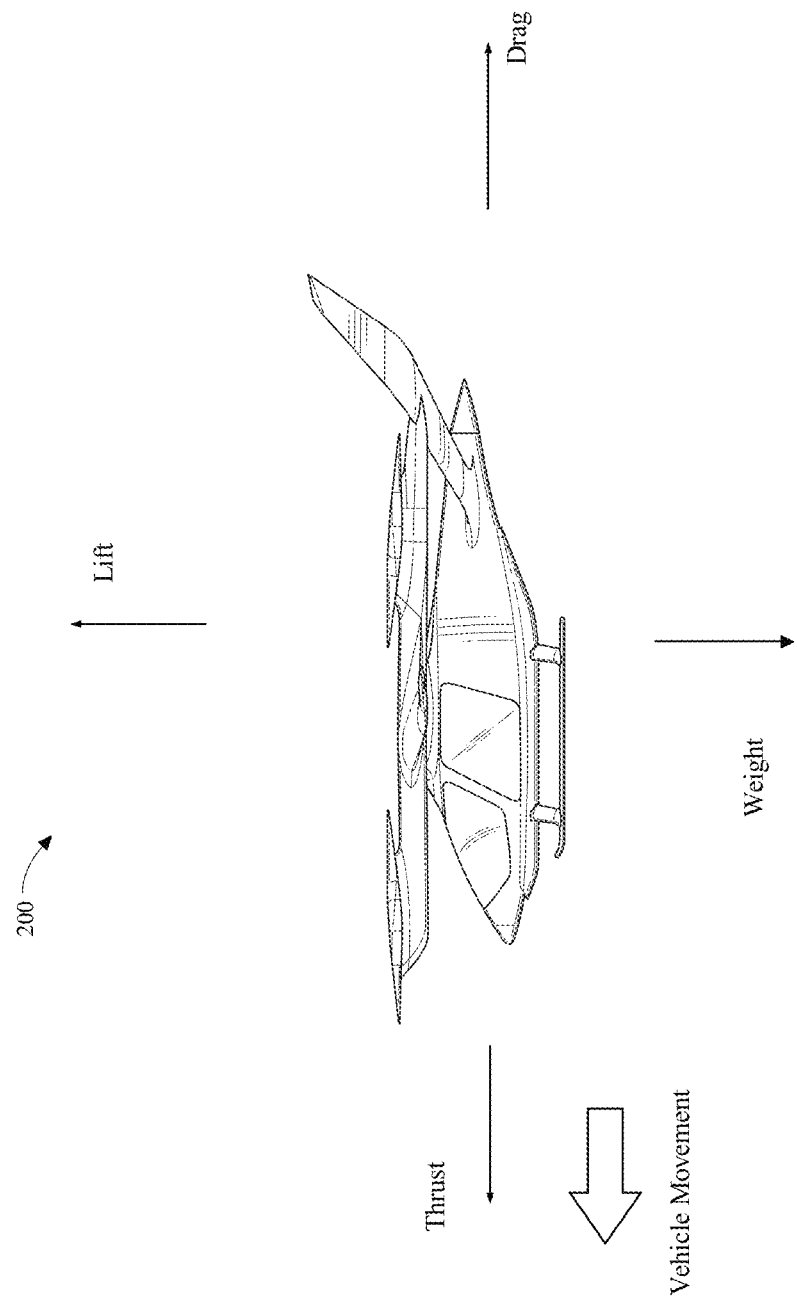
FIG. 2 is a diagrammatic representation of an electric aircraft.

Now referring to FIG. 2, system 100 may be incorporated into an electrically powered aircraft 200. Electrically powered aircraft 200 may be an electric vertical takeoff and landing (eVTOL) aircraft. Electrically powered aircraft 200 may include at least a load 108 of a plurality of loads. Electrically powered aircraft 200 may include an aircraft controller 112 communicatively and/or operatively connected to each load 108. Electrically powered aircraft 200 may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

Continuing to refer to FIG. 2, an illustration of aerodynamic forces is illustrated in an electric aircraft. During flight, a number of aerodynamic forces may act upon the electric aircraft. Forces acting on an aircraft 200 during flight may include thrust, the forward force produced by the rotating element of the aircraft 200 and acts parallel to the longitudinal axis. Drag may be defined as a rearward retarding force which is caused by disruption of airflow by any protruding surface of the aircraft 200 such as, without limitation, the wing, rotor, and fuselage. Drag may oppose thrust and acts rearward parallel to the relative wind. Another force acting on aircraft 200 may include weight, which may include a combined load of the aircraft 200 itself, crew, baggage and fuel. Weight may pull aircraft 200 downward due to the force of gravity. An additional force acting on aircraft 200 may include lift, which may act to oppose the downward force of weight and may be produced by the dynamic effect of air acting on the airfoil and/or downward thrust from at least a propulsor 108. Lift generated by the airfoil may depends on speed of airflow, density of air, total area of an airfoil and/or segment thereof, and/or an angle of attack between air and the airfoil.

Figure 3:
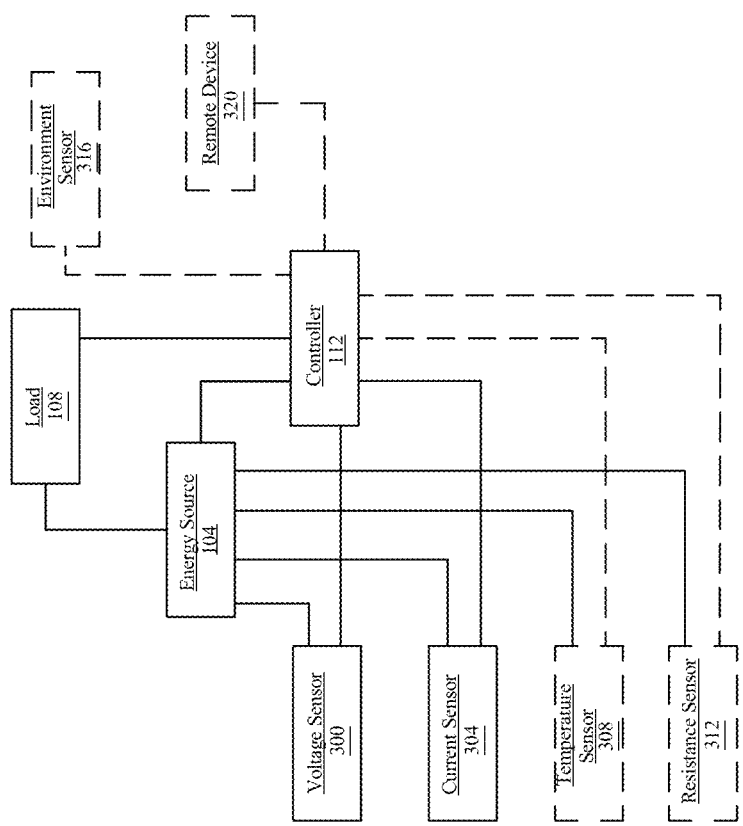
FIG. 3 is a high-level block diagram depicting an exemplary embodiment of energy source and sensors in an aircraft.

Referring now to FIG. 3, a plurality of sensors, each or all of which may act as at least a sensor 116, may be incorporated in system 100. Sensors of plurality of sensors may be designed to measure a plurality of electrical parameters or environmental data in-flight, for instance as described above. Plurality of sensors may, as a non-limiting example, include a voltage sensor 300 designed and configured to measure the voltage of at least an energy source 104, as described above in reference to FIG. 1. As an example and without limitation, the plurality of sensors may include a current sensor 304 designed and configured to measure the current of at least an energy source 104, as described above in reference to FIG. 1. As a further example and without limitation, the plurality of sensors may include a temperature sensor 308 designed and configured to measure the temperature of at least an energy source 104. As another non-limiting example, the plurality of sensors may include a resistance sensor 312 designed and configured to measure the resistance of at least an energy source 104.

Continuing to refer to FIG. 3, the plurality of sensors may include at least an environmental sensor 316. In an embodiment, environmental sensor may sense one or more environmental conditions or parameters outside the electric aircraft, inside the electric aircraft, or within or at any component thereof, including without limitation at least an energy source 104, at least a propulsor, or the like; environmental sensor may include, without limitation, a temperature sensor, a barometric pressure sensor, an air velocity sensor, one or more motion sensors which may include gyroscopes, accelerometers, and/or a inertial measurement unit (IMU), a magnetic sensor, humidity sensor, an oxygen sensor and/or a wind speed sensor. At least a sensor 116 may include at least a geospatial sensor. As used herein, a geospatial sensor may include without limitation optical devices, radar devices, Lidar devices, and/or Global Positioning System (GPS) devices, and may be used to detect aircraft location, aircraft speed, aircraft altitude and/or whether the aircraft is on the correct location of the flight plan. Environmental sensor 432 may be designed and configured to measure geospatial data to determine the location and altitude of the electronically powered aircraft by any location method including, without limitation, GPS, optical, satellite, lidar, radar. Environmental sensor 432 may be designed and configured to measure at a least a parameter of the motor. Environmental sensor 432 may be designed and configured to measure at a least a parameter of the propulsor. Environmental sensor 432 may be configured to measure conditions external to the electrical aircraft 404 such as, without limitation, humidity, altitude, barometric pressure, temperature, noise and/or vibration. Sensor datum collected in flight may be transmitted to the aircraft controller 112 or to a remote device 320, which may be any device, as described below in reference to FIG. 9. As an example and without limitation, remote device 320 may be used to compare the at least an electrical parameter to the at least a current allocation threshold and/or detect that the at least an electrical parameter has reached the current allocation threshold, as described in further detail below.

Figure 4A:
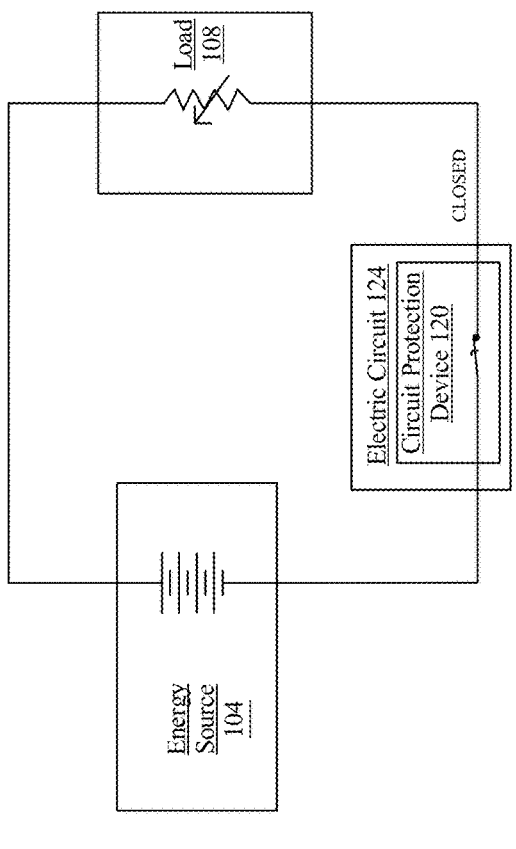
FIGS. 4A-B are schematic diagrams depicting exemplary embodiments of a circuit protection device.

Now referring to FIG. 4A, circuit protection device 120 is shown in a circuit. Circuit protection device 120 may function in response to a number of electrical events. A short circuit may form where there is a hard short between a high voltage side of a circuit and the ground, return, and/or virtual ground, or the like. Potential hazards resulting from a short circuit may include overheating of wires and subsequent faults as well as damage to equipment (equipment bonding). All protective devices as described above may be designed to respond to a shorting event. An overload condition may occur where the loads in the circuit are pulling more current than the system is designed to handle. As an example and without limitation, a load may draw 20 A of current on a 15 A current resulting in an overload condition. Parallel arcing may also occur where electricity discharges across an insulting medium such as two wires carrying current. As a further example and without limitation, faulty operation of equipment wired in an aircraft or other devices may also cause conditions that may cause a circuit protection device to trip to protect a device. In the circuit, energy source 104 is connected to a load, such as a load of plurality of loads 108. In an embodiment and without limitation, load 108 may include a propulsor in an electric aircraft. During normal operation, current flows within electrical circuit 124 as illustrated in FIG. 4A.

Figure 4B:
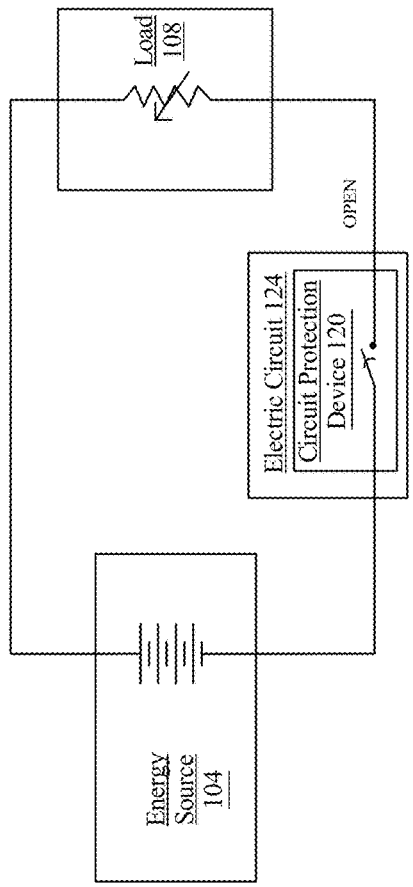

Referring now to FIG. 4B, illustrated is the circuit when circuit protection device 120 is engaged and open. When circuit protection device 120 is engaged, electrical circuit 124 may be open, preventing and stopping current flow from at least an energy source 104 to plurality of loads 108. As an additional example and without limitation, circuit protection device 120 may shunt current away from electrical circuit 124. Engagement of the circuit protection device 120 may, as an example and without limitation, occur upon tripping a threshold, or limit, based on an electrical parameter, which may be any electrical parameter as described above. In an embodiment and without limitation, sensor 116 may measure current draw between an energy source 104 and a plurality of loads 108. At a predetermined circuit protection threshold, aircraft controller 112 may engage circuit protection device 120 to current flow, thus reducing risk of damage to electrical circuit 124 and/or devices or components connected to the electrical circuit 124. Circuit protection threshold, as described herein, may be the maximum allowed current flow and/or voltage flow the electric circuit 124 is able to withstand. As another example and without limitation, circuit protection threshold may be the maximum current flow and/or voltage flow each load 108 of the plurality of loads is able to utilize without negative system impacts. In another embodiment and without limitation, aircraft controller 112 may sense current flow from a propulsor in an electrical aircraft driven by at least an energy source 104.

Figure 5:
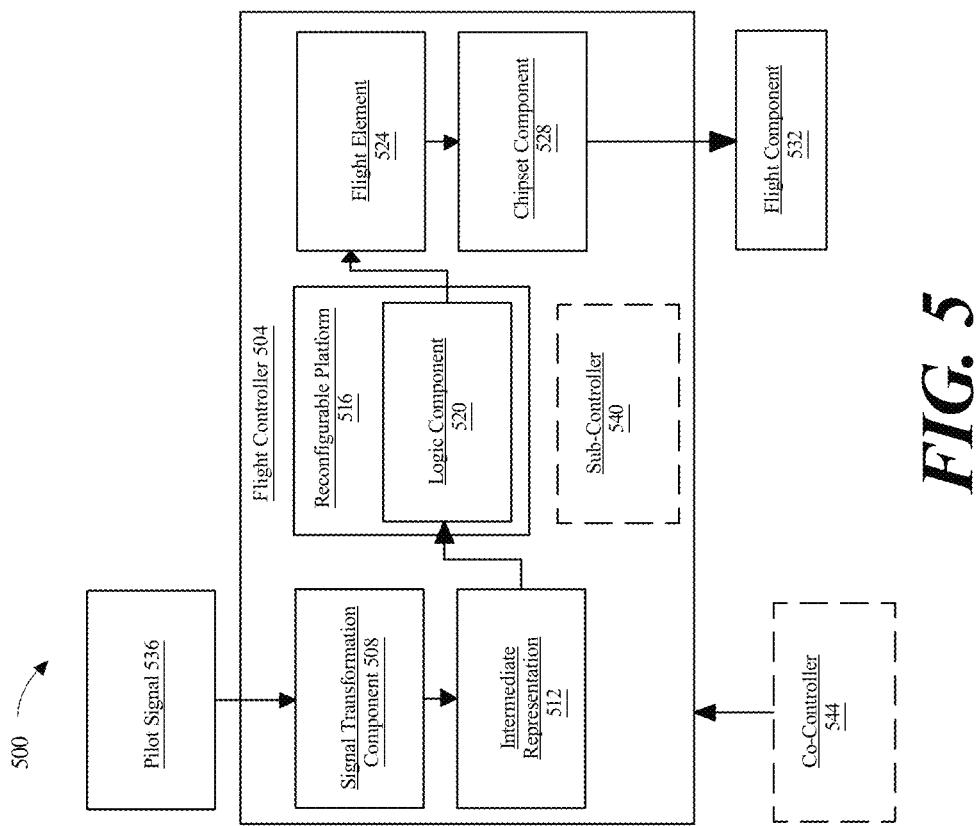
FIG. 5 is a block diagram of an exemplary embodiment of a flight controller.

Now referring to FIG. 5, an exemplary embodiment 500 of a flight controller 504 is illustrated. As used in this disclosure a "flight controller" is a computing device of a plurality of computing devices dedicated to data storage, security, distribution of traffic for load balancing, and flight instruction. Flight controller 504 may include and/or communicate with any computing device as described in this disclosure, including without limitation a microcontroller, microprocessor, digital signal processor (DSP) and/or system on a chip (SoC) as described in this disclosure. Further, flight controller 504 may include a single computing device operating independently, or may include two or more computing device operating in concert, in parallel, sequentially or the like; two or more computing devices may be included together in a single computing device or in two or more computing devices. In embodiments, flight controller 504 may be installed in an aircraft, may control the aircraft remotely, and/or may include an element installed in the aircraft and a remote element in communication therewith.

In an embodiment, and still referring to FIG. 5, flight controller 504 may include a signal transformation component 508. As used in this disclosure a "signal transformation component" is a component that transforms and/or converts a first signal to a second signal, wherein a signal may include one or more digital and/or analog signals. For example, and without limitation, signal transformation component 508 may be configured to perform one or more operations such as preprocessing, lexical analysis, parsing, semantic analysis, and the like thereof. In an embodiment, and without limitation, signal transformation component 508 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 508 may include transforming one or more low-level languages such as, but not limited to, machine languages and/or assembly languages. For example, and without limitation, signal transformation component 508 may include transforming a binary language signal to an assembly language signal. In an embodiment, and without limitation, signal transformation component 508 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 5, signal transformation component 508 may be configured to optimize an intermediate representation 512. As used in this disclosure an "intermediate representation" is a data structure and/or code that represents the input signal. Signal transformation component 508 may optimize intermediate representation as a function of a data-flow analysis, dependence analysis, alias analysis, pointer analysis, escape analysis, and the like thereof. In an embodiment, and without limitation, signal transformation component 508 may optimize intermediate representation 512 as a function of one or more inline expansions, dead code eliminations, constant propagation, loop transformations, and/or automatic parallelization functions. In another embodiment, signal transformation component 508 may optimize intermediate representation as a function of a machine dependent optimization such as a peephole optimization, wherein a peephole optimization may rewrite short sequences of code into more efficient sequences of code. Signal transformation component 508 may optimize intermediate representation to generate an output language, wherein an "output language," as used herein, is the native machine language of flight controller 504. For example, and without limitation, native machine language may include one or more binary and/or numerical languages.

In an embodiment, and without limitation, signal transformation component 508 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 5, flight controller 504 may include a reconfigurable hardware platform 516. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 516 may be reconfigured to enact any algorithm and/or algorithm selection process received from another computing device and/or created using machine-learning processes.

Still referring to FIG. 5, reconfigurable hardware platform 516 may include a logic component 520. As used in this disclosure a "logic component" is a component that executes instructions on output language. For example, and without limitation, logic component may perform basic arithmetic, logic, controlling, input/output operations, and the like thereof. Logic component 520 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 520 may be organized according to Von Neumann and/or Harvard architecture as a non-limiting example. Logic component 520 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC). In an embodiment, logic component 520 may include one or more integrated circuit microprocessors, which may contain one or more central processing units, central processors, and/or main processors, on a single metal-oxide-semiconductor chip. Logic component 520 may be configured to execute a sequence of stored instructions to be performed on the output language and/or intermediate representation 512. Logic component 520 may be configured to fetch and/or retrieve the instruction from a memory cache, wherein a "memory cache," as used in this disclosure, is a stored instruction set on flight controller 504. Logic component 520 may be configured to decode the instruction retrieved from the memory cache to opcodes and/or operands. Logic component 520 may be configured to execute the instruction on intermediate representation 512 and/or output language. For example, and without limitation, logic component 520 may be configured to execute an addition operation on intermediate representation 512 and/or output language.

In an embodiment, and without limitation, logic component 520 may be configured to calculate a flight element 524. As used in this disclosure a "flight element" is an element of datum denoting a relative status of aircraft. For example, and without limitation, flight element 524 may denote one or more torques, thrusts, airspeed velocities, forces, altitudes, groundspeed velocities, directions during flight, directions facing, forces, orientations, and the like thereof. For example, and without limitation, flight element 524 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 524 may denote that aircraft is following a flight path accurately and/or sufficiently.

Still referring to FIG. 5, flight controller 504 may include a chipset component 528. As used in this disclosure a "chipset component" is a component that manages data flow. In an embodiment, and without limitation, chipset component 528 may include a northbridge data flow path, wherein the northbridge dataflow path may manage data flow from logic component 520 to a high-speed device and/or component, such as a RAM, graphics controller, and the like thereof. In another embodiment, and without limitation, chipset component 528 may include a southbridge data flow path, wherein the southbridge dataflow path may manage data flow from logic component 520 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 528 may manage data flow between logic component 520, memory cache, and a flight component 532. As used in this disclosure a "flight component" is a portion of an aircraft that can be moved or adjusted to affect one or more flight elements. For example, flight component 532 may include a component used to affect the aircrafts' roll and pitch which may comprise one or more ailerons. As a further example, flight component 532 may include a rudder to control yaw of an aircraft. In an embodiment, chipset component 528 may be configured to communicate with a plurality of flight components as a function of flight element 524. For example, and without limitation, chipset component 528 may transmit to an aircraft rotor to reduce torque of a first lift propulsor and increase the forward thrust produced by a pusher component to perform a flight maneuver.

In an embodiment, and still referring to FIG. 5, flight controller 504 may be configured generate an autonomous function. As used in this disclosure an "autonomous function" is a mode and/or function of flight controller 504 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 524. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 504 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 504 will control the ailerons and/or rudders. As used in this disclosure "non-autonomous mode" is a mode that denotes a pilot will control aircraft and/or maneuvers of aircraft in its entirety.

In an embodiment, and still referring to FIG. 5, flight controller 504 may generate autonomous function as a function of an autonomous machine-learning model. As used in this disclosure an "autonomous machine-learning model" is a machine-learning model to produce an autonomous function output given flight element 524 and a pilot signal 536 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 536 may denote that a pilot is controlling and/or maneuvering ailerons, wherein the pilot is not in control of the rudders and/or propulsors. In an embodiment, pilot signal 536 may include an implicit signal and/or an explicit signal. For example, and without limitation, pilot signal 536 may include an explicit signal, wherein the pilot explicitly states there is a lack of control and/or desire for autonomous function. As a further non-limiting example, pilot signal 536 may include an explicit signal directing flight controller 504 to control and/or maintain a portion of aircraft, a portion of the flight plan, the entire aircraft, and/or the entire flight plan. As a further non-limiting example, pilot signal 536 may include an implicit signal, wherein flight controller 504 detects a lack of control such as by a malfunction, torque alteration, flight path deviation, and the like thereof. In an embodiment, and without limitation, pilot signal 536 may include one or more explicit signals to reduce torque, and/or one or more implicit signals that torque may be reduced due to reduction of airspeed velocity. In an embodiment, and without limitation, pilot signal 536 may include one or more local and/or global signals. For example, and without limitation, pilot signal 536 may include a local signal that is transmitted by a pilot and/or crew member. As a further non-limiting example, pilot signal 536 may include a global signal that is transmitted by air traffic control and/or one or more remote users that are in communication with the pilot of aircraft. In an embodiment, pilot signal 536 may be received as a function of a tri-state bus and/or multiplexor that denotes an explicit pilot signal should be transmitted prior to any implicit or global pilot signal.

Still referring to FIG. 5, autonomous machine-learning model may include one or more autonomous machine-learning processes such as supervised, unsupervised, or reinforcement machine-learning processes that flight controller 504 and/or a remote device may or may not use in the generation of autonomous function. As used in this disclosure "remote device" is an external device to flight controller 504. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 5, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 504 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 5, flight controller 504 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 504. Remote device and/or FPGA may transmit a signal, bit, datum, or parameter to flight controller 504 that at least relates to autonomous function. Additionally or alternatively, the remote device and/or FPGA may provide an updated machine-learning model. For example, and without limitation, an updated machine-learning model may be comprised of a firmware update, a software update, a autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 504 as a software update, firmware update, or corrected habit machine-learning model. For example, and without limitation autonomous machine learning model may utilize a neural net machine-learning process, wherein the updated machine-learning model may incorporate a gradient boosting machine-learning process.

Still referring to FIG. 5, flight controller 504 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 5, flight controller 504 may include, but is not limited to, for example, a cluster of flight controllers in a first location and a second flight controller or cluster of flight controllers in a second location. Flight controller 504 may include one or more flight controllers dedicated to data storage, security, distribution of traffic for load balancing, and the like. Flight controller 504 may be configured to distribute one or more computing tasks as described below across a plurality of flight controllers, which may operate in parallel, in series, redundantly, or in any other manner used for distribution of tasks or memory between computing devices. For example, and without limitation, flight controller 504 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Massachusetts, USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 5, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 532. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 5, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 504. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 512 and/or output language from logic component 520, wherein output language may include one or more analog-to-digital conversions, low bit rate transmissions, message encryptions, digital signals, binary signals, logic signals, analog signals, and the like thereof described above in detail.

Still referring to FIG. 5, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 5, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 5, flight controller 504 may also be implemented using a "shared nothing" architecture in which data is cached at the worker, in an embodiment, this may enable scalability of aircraft and/or computing device. Flight controller 504 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 5, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 5, flight controller may include a sub-controller 540. As used in this disclosure a "sub-controller" is a controller and/or component that is part of a distributed controller as described above; for instance, flight controller 504 may be and/or include a distributed flight controller made up of one or more sub-controllers. For example, and without limitation, sub-controller 540 may include any controllers and/or components thereof that are similar to distributed flight controller and/or flight controller as described above. Sub-controller 540 may include any component of any flight controller as described above. Sub-controller 540 may be implemented in any manner suitable for implementation of a flight controller as described above. As a further non-limiting example, sub-controller 540 may include one or more processors, logic components and/or computing devices capable of receiving, processing, and/or transmitting data across the distributed flight controller as described above. As a further non-limiting example, sub-controller 540 may include a controller that receives a signal from a first flight controller and/or first distributed flight controller component and transmits the signal to a plurality of additional sub-controllers and/or flight components.

Still referring to FIG. 5, flight controller may include a co-controller 544. As used in this disclosure a "co-controller" is a controller and/or component that joins flight controller 504 as components and/or nodes of a distributer flight controller as described above. For example, and without limitation, co-controller 544 may include one or more controllers and/or components that are similar to flight controller 504. As a further non-limiting example, co-controller 544 may include any controller and/or component that joins flight controller 504 to distributer flight controller. As a further non-limiting example, co-controller 544 may include one or more processors, logic components and/or computing devices capable of receiving, processing, and/or transmitting data to and/or from flight controller 504 to distributed flight control system. Co-controller 544 may include any component of any flight controller as described above. Co-controller 544 may be implemented in any manner suitable for implementation of a flight controller as described above.

In an embodiment, and with continued reference to FIG. 5, flight controller 504 may be designed and/or configured to perform any method, method step, or sequence of method steps in any embodiment described in this disclosure, in any order and with any degree of repetition. For instance, flight controller 504 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 6:
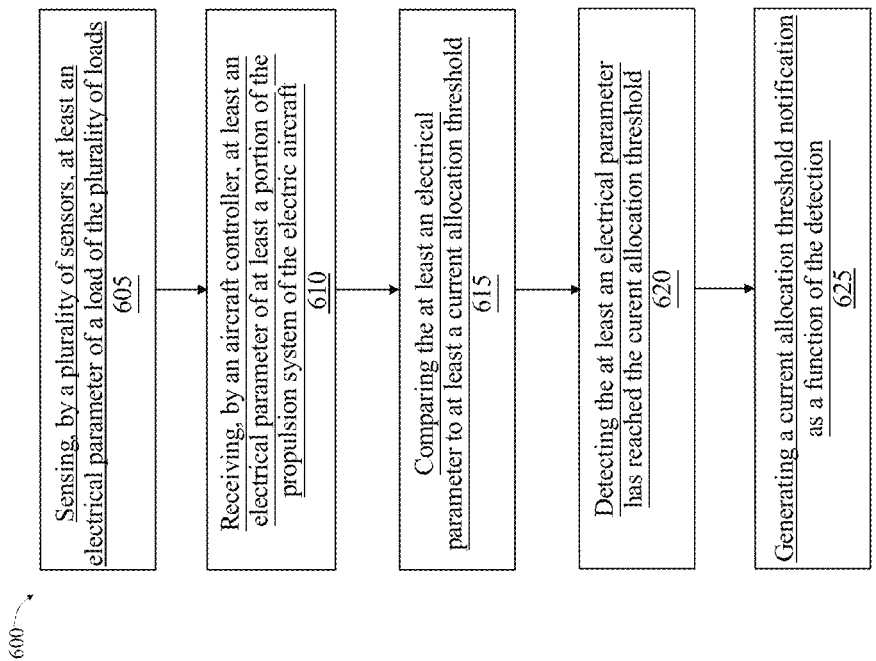
FIG. 6 is a flow chart showing the method of restricting power.

Now referring to FIG. 6, an exemplary embodiment of method 600 of restricting power to a plurality of loads to prevent engaging a circuit protection device for an aircraft is illustrated. At step 605, each sensor 116 of a plurality of sensors senses an electrical parameter from an electrical circuit 124 which includes at least an energy source 104 driving a plurality of loads 108. Electrical circuit 124 may include a circuit protection device 120. A least an electrical parameter may include any electrical parameter as described above, including without limitation a voltage, current, resistance, temperature or environmental parameter. At least an electrical parameter may be measured, for instance, using any means or method as described above, including using at least a sensor 116 and/or via an electrical or other connection between aircraft controller 112 and at least an energy source 104.

Continuing to refer to FIG. 6, in an embodiment, sensing at least an electrical parameter may include measuring a voltage. Voltage of a battery cell, a plurality of battery cells, modules or plurality of modules may be measured. Voltage under plurality of loads 108 may be alternatively or additionally measured or detected. sensing at least an electrical parameter may include measuring a current; a current of a battery cell, a plurality of battery cells, modules or plurality of modules may be measured. Sensing at least an electrical parameter may include inferring or calculating an electrical parameter based on sensed electrical parameters, for instance by using Ohm's law or other relations as described and/or discussed above to calculate resistance and/or impedance from detected voltage and current levels. At least an electrical parameter may include signal properties such as frequency, wavelength, or amplitude of one or more components of a voltage or current signal. Persons skilled in the art, upon reviewing the entirety of this disclosure, will be aware of various electrical parameters, and techniques for measuring such parameters, consistent with this disclosure.

Still referring to FIG. 6 at least an electrical parameter may be a current. At least a sensor 116 of a plurality of sensors may measure current directly or calculate the current given other electrical parameters which include voltage and resistance. Current of any component in energy source 104, such as a cell, battery cells, plurality of battery cells may be measured. Current flow through wires, a plurality of wires, or other electrical components by which current is carried may be measured. Current flowing between two components of system 100 may be measured; the two components may be connected via current carrying wire. In an embodiment, such as where system 100 is in an electric aircraft, wire gauge may be reduced in order to save on weight, which may be critical to the design of the aircraft. When the wire gauge is reduced, the potential for overload of current in the wire with current may rise. Any current flow that is in excess of the current carrying capability of the wire may cause heat, and rapid heat may be caused when a direct short is created. These conditions may engage circuit protection device at a circuit protection device threshold.

Still referring to FIG. 6, at step 610, aircraft controller 112 receives at least an electrical parameter of a load 108 of the plurality of loads from each sensor 116 of the plurality of sensors. At least an electrical parameter of a load 108 is any electrical parameter as described above in reference to FIGS. 1-5. At step 615, aircraft controller 112 compares at least an electrical parameter to a current allocation threshold. Comparing at least an electrical parameter to a current allocation threshold may include periodic comparison, continuous comparison, and any combination thereof. Current allocation threshold may be the value at which the aircraft controller 112 will recalculate and redistribute power to the plurality of loads 108, for instance as set forth in the disclosure below. Current allocation threshold may be generated as a function of at least a circuit protection threshold; for instance and without limitation, the current allocation limit may be a set reduction, increase, percentage or other calculation method of the circuit detection limit. Current allocation threshold may include a current threshold, a voltage threshold, a resistance threshold, a temperature threshold, or the like. Current allocation threshold may be derived from in flight data, from manufacturer data, form integrator data, or the like, as described above in reference to FIG. 1.

Still referring to FIG. 5, at step 620, aircraft controller 112 detects that the at least an electrical parameter has reached the current allocation threshold. Detecting the at least an electrical parameter has reached the current allocation threshold may be performed by the controller, computer, remote device or by a person. Detection may, as an example and without limitation, be done by using a direct comparison to determine if the at least an electrical parameter has reached the current allocation threshold. For instance, detection may occur where controller 112 measures a current of 6 A and the current allocation threshold is 6 A. Detection may, as a further non-limiting example, involve the use of calculations or formulas to determine if the current allocation threshold is or has been reached. As another example and without limitation, detecting may be performed by graphing and/or mapping the at least an electrical parameter versus time to determine if the current allocation threshold is reached. Further examples of aircraft controller 112 detecting the at least an electrical parameter has reached the current allocation threshold are described above in reference to FIG. 1.

Continuing to refer to FIG. 6, at step 625, aircraft controller 112 generates a current allocation threshold notification as a function of the detection that the at least an electrical parameter has reached the current allocation threshold. Current allocation threshold notification may include any form of electrical signal or communication as described herein. Current allocation threshold notification may include a form of communication not described herein. Current allocation threshold notification may be displayed to a user, computer, or combination thereof with a GUI. Current allocation threshold notification may include prompting one or more users, computing devices, electrical components, or a combination thereof for an interaction. The interaction may include acceptance, denial, adjustment of a suggestion presented in current allocation threshold notification by aircraft controller 112 or flight controller 504. Current allocation threshold notification may include adjustment of one or more electrical parameters of one or more electrical components described herein such as current being outputted from one or more energy sources and/or propulsors.

Continuing to refer to FIG. 6, at step 630, aircraft controller 112 calculates a power reduction to at least a load of a plurality of loads 108. The power reduction calculated to at least a load includes using the current allocation threshold limit, the at least an electrical parameter which, in aggregate, will continue to keep the at least an electrical parameter that is sensed below the current allocation threshold. The power reduction calculation may include more than on electrical parameter, a comparison to a graph or other calculated data set, such as a table. In an embodiment, the current allocation calculation assuming a set percentage offset of the current allocation threshold and calculated the aggregate power demand of at least a plurality of loads 108. In another embodiment, aircraft controller 112 calculated a set reduction to each load, of at least a plurality of loads 108 and then calculated the aggregate and compares that value to the current allocation threshold.

Still referring to FIG. 6, controller 112 may determine a minimum power demand of plurality of loads 108, which can be a propulsor, of plurality of propulsors, needed for a particular phase of flight using the speed, distance, altitude and the like. The minimum power needed may be used to determine a power reduction for the phase of flight. The calculation may use manufacturing data or data collected by a plurality of sensors during flight. Using the minimum power demand for a particular phase of flight, aircraft controller 112 may determine the total power demand for the plurality of loads by using the power demand of an individual propulsor and multiplying that by the number of loads. Further examples of aircraft controller 112 determining a minimum power demand for each load of the plurality of loads 108 are described above in reference to FIG. 1.

Still referring to FIG. 6, aircraft controller 112 may reduce power from the at least an energy source 104 to each load of the plurality of loads 108. Reducing power from the at least an energy source 104 to each load of the plurality of loads may include disconnecting the communication between the at least an energy source 104 and the at least an electrical circuit 124, as described above in reference to FIGS. 1-3. Reducing power from the at least an energy source 104 to each load of the plurality of loads may further include reconnecting the communication between the at least an energy source 104 and the at least an electrical circuit 124, as described above in reference to FIGS. 1-3. Reducing power from the at least an energy source 104 to each load of the plurality of loads may further include preventing communication between the at least an energy source 104 and the at least an electrical circuit 124, as described above in reference to FIGS. 1-3. In an embodiment and without limitation, aircraft controller 112 may direct a power reduction to a load 108, of a plurality of loads of an electric aircraft.

Figure 7A:
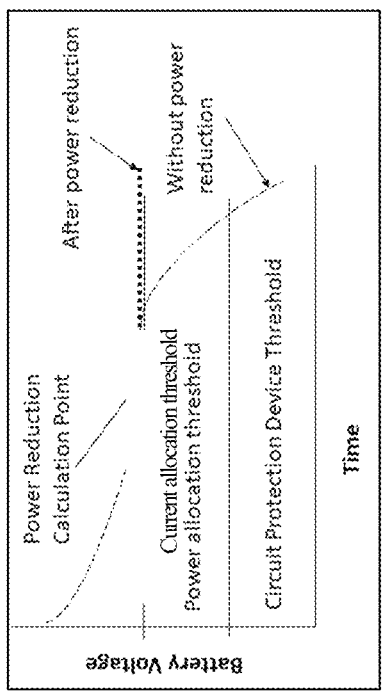
FIGS. 7A-B show electrical parameter measurements over time in relation to threshold limits.
Figure 7B:
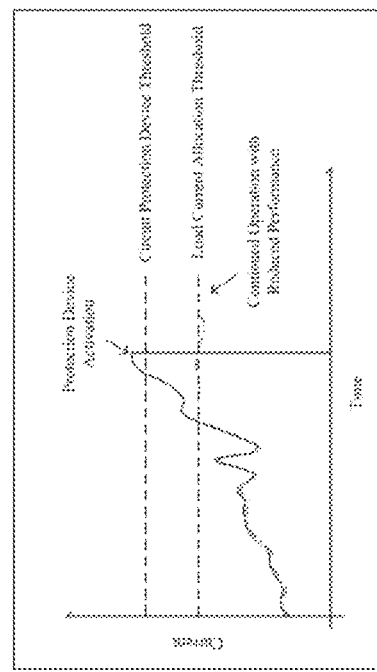

Now referring to FIG. 7A-B, FIG. 7A displays a graph showing a graph of exemplary voltage measurements over time of a component. For example and without limitation, a component, as described herein, may include energy source 104, a load of plurality of loads 108, any combination thereof, or the like. Illustrated in FIG. 7A is a current allocation threshold. The current allocation threshold is an upper limit where controller 112 will calculate a power reduction to plurality of loads 108, such that the voltage does not exceed a threshold where the circuit protection device 120 is engaged. As displayed in FIG. 7A, the dotted line demonstrates where power reduction has occurred thus reducing the risk of engaging the circuit protection device 120. FIG. 7B displays a graph showing similar conditions to FIG. 7A. FIG. 7B displays plots of current over time, as opposed to FIG. 7A displaying voltage over time. FIG. 7B demonstrates the point at which controller 112 will reduce the power reduction of a load and the resulting measurements decreasing risk of engaging the circuit protection device 120.

In an embodiment, the above-described elements may alleviate problems resulting from systems wherein a circuit protection device is engaged, and critical functions are denied power. This can compromise the safety of the flight due to the termination of current to a critical function in the aircraft. An in-flight current allocation for the remaining in-flight power output capacity to reduce the risk of engaging a circuit protection device will ensure safe operation for any phase of the flight including taxi, take off, cruise and landing modes. There are other methods which can reduce the risk of engaging a circuit protection device, which includes increasing the wires and current carrying equipment, but this adds weight to the aircraft that is not desirable. Above-described embodiments enable the optimization of power sources in a lightweight and robust configuration compatible with safe and high-performance flight.

Figure 8:
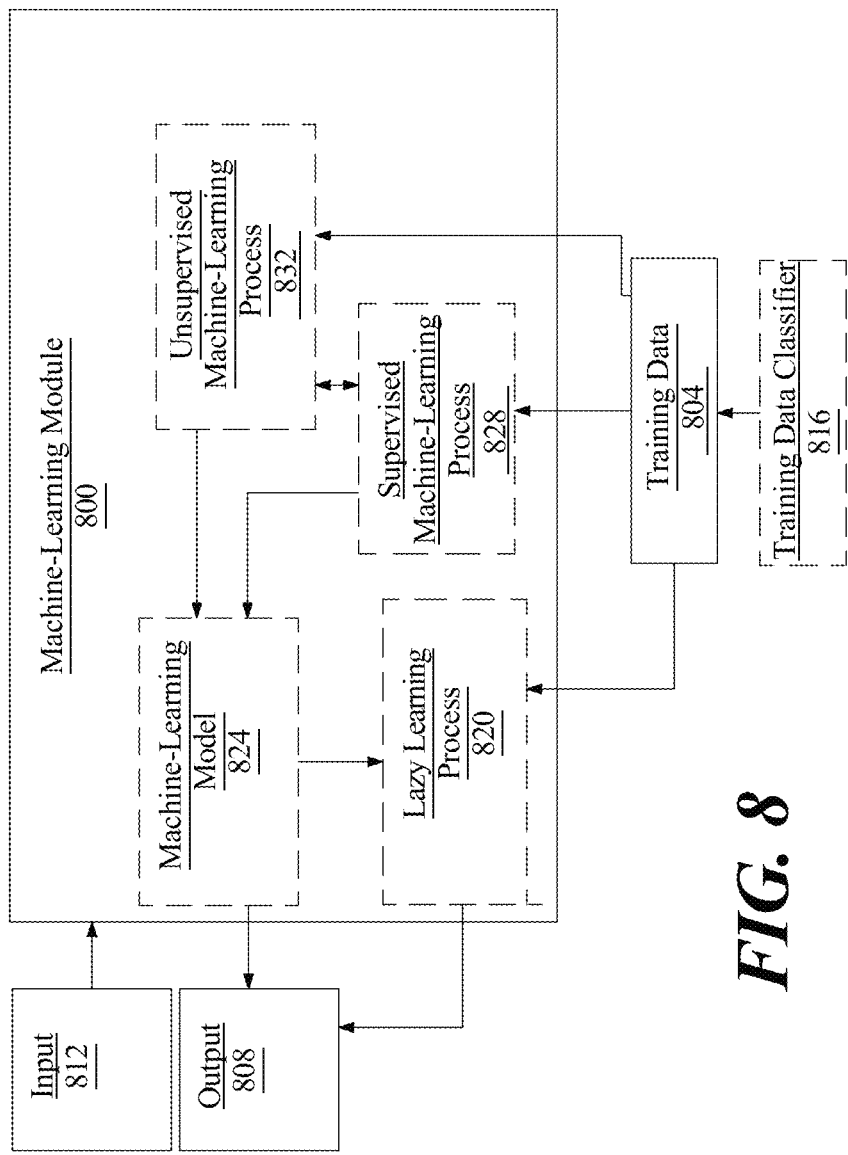
FIG. 8 is a block diagram of an exemplary embodiment of a machine learning module.

Referring now to FIG. 8, an exemplary embodiment of a machine-learning module 800 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 804 to generate an algorithm that will be performed by a computing device/module to produce outputs 808 given data provided as inputs 812; this is in contrast to a non-machine learning software program where the commands to be executed are determined in advance by a user and written in a programming language.

Still referring to FIG. 8, "training data," as used herein, is data containing correlations that a machine-learning process may use to model relationships between two or more categories of data elements. For instance, and without limitation, training data 804 may include a plurality of data entries, each entry representing a set of data elements that were recorded, received, and/or generated together; data elements may be correlated by shared existence in a given data entry, by proximity in a given data entry, or the like. Multiple data entries in training data 804 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 804 according to various correlations; correlations may indicate causative and/or predictive links between categories of data elements, which may be modeled as relationships such as mathematical relationships by machine-learning processes as described in further detail below. Training data 804 may be formatted and/or organized by categories of data elements, for instance by associating data elements with one or more descriptors corresponding to categories of data elements. As a non-limiting example, training data 804 may include data entered in standardized forms by persons or processes, such that entry of a given data element in a given field in a form may be mapped to one or more descriptors of categories. Elements in training data 804 may be linked to descriptors of categories by tags, tokens, or other data elements; for instance, and without limitation, training data 804 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 8, training data 804 may include one or more elements that are not categorized; that is, training data 804 may not be formatted or contain descriptors for some elements of data. Machine-learning algorithms and/or other processes may sort training data 804 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 804 to be made applicable for two or more distinct machine-learning algorithms as described in further detail below. Training data 804 used by machine-learning module 800 may correlate any input data as described in this disclosure to any output data as described in this disclosure. As a non-limiting illustrative example flight elements and/or pilot signals may be inputs, wherein an output may be an autonomous function.

Further referring to FIG. 8, training data may be filtered, sorted, and/or selected using one or more supervised and/or unsupervised machine-learning processes and/or models as described in further detail below; such models may include without limitation a training data classifier 816. Training data classifier 816 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 800 may generate a classifier using a classification algorithm, defined as a processes whereby a computing device and/or any module and/or component operating thereon derives a classifier from training data 804. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to sub-categories of flight elements such as torques, forces, thrusts, directions, and the like thereof.

Still referring to FIG. 8, machine-learning module 800 may be configured to perform a lazy-learning process 820 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 804. Heuristic may include selecting some number of highest-ranking associations and/or training data 804 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 8, machine-learning processes as described in this disclosure may be used to generate machine-learning models 824. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 824 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 824 may be generated by creating an artificial neural network, such as a convolutional neural network comprising an input layer of nodes, one or more intermediate layers, and an output layer of nodes. Connections between nodes may be created via the process of "training" the network, in which elements from a training data 804 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 8, machine-learning algorithms may include at least a supervised machine-learning process 828. At least a supervised machine-learning process 828, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 804. Persons skilled in the art, upon reviewing the entirety of this disclosure, will be aware of various possible variations of at least a supervised machine-learning process 828 that may be used to determine relation between inputs and outputs. Supervised machine-learning processes may include classification algorithms as defined above.

Further referring to FIG. 8, machine learning processes may include at least an unsupervised machine-learning processes 832. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 8, machine-learning module 800 may be designed and configured to create a machine-learning model 824 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 8, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
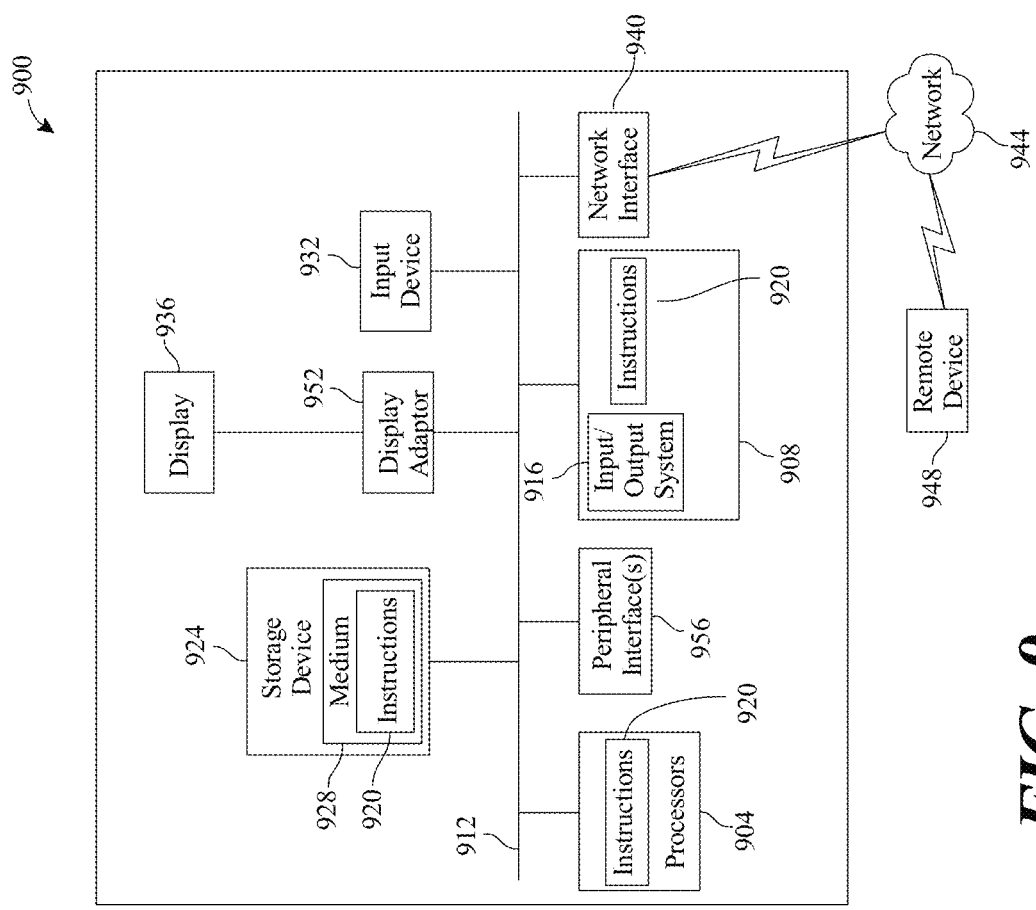
FIG. 9 is block diagram of a computing system that can be used to implement any one or more of the methodologies disclosed herein and any one or more portions thereof.

FIG. 9 shows a diagrammatic representation of one embodiment of a computing device in the exemplary form of a computer system 900 within which a set of instructions for causing a control system, such as the system 100 system of FIG. 9, to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for allocating power to a load, the system comprising:
    at least one energy source of an electric aircraft, wherein the at least one energy source is communicatively coupled to at least one load of a plurality of loads, wherein the at least one load comprises at least a portion of a propulsion system of the electric aircraft;
    at least one sensor mounted on the electric aircraft, wherein the at least one sensor is configured to detect at least one electrical parameter of at least one energy source;
    an aircraft controller communicatively connected to the at least one energy source, wherein the controller is configured to:
        receive at least one electrical parameter of at least one energy source from at least one sensor;
        determine a power demand for at least one load of the plurality of loads for a particular phase of flight as a function of the at least one electrical parameter;
        calculate a power allocation threshold wherein the power allocation threshold is a function of a circuit protection threshold;
        compare the power demand to the power allocation threshold; and
        calculate a power reduction to the at least one load as a function of the comparison; and
    at least an electrical circuit of the electric aircraft, wherein the at least an electrical circuit comprises:
        a circuit protection device communicatively connected the aircraft controller.

2. The system of claim 1, wherein the propulsion system of the electric aircraft comprises a plurality of propulsors.

3. The system of claim 2, wherein the controller is further configured to determine a balance of the electric aircraft as a result of the power reduction to the at least a load.

4. The system of claim 1, wherein:
    the controller is further configured to:
    calculate a remaining power for at least one energy source as a function of the electrical parameter of at least one energy source; and
    compare the power demand to the remaining power,
    wherein calculating the power reduction further comprises calculating the power reduction as a function of comparing the power demand to the remaining power.

5. The system of claim 4, wherein the power demand and the remaining power each comprise a voltage value.

6. The system of claim 1, wherein the electrical parameter comprises a voltage level.

7. The system of claim 1, wherein the at least one sensor includes a plurality of sensors that are configured to additionally sense a second electrical parameter of at least a portion of the propulsion system of the electric aircraft.

8. The system of claim 7, wherein the aircraft controller is additionally designed and configured to:
    receive the second electrical parameter of at least a portion of the propulsion system of the electric aircraft;
    compare the second electrical parameter to at least a current allocation threshold, wherein the current allocation threshold is generated as a function of at least a circuit protection threshold of load; and
    detect that the second electrical parameter has reached the current allocation threshold,
    wherein calculating the power reduction further comprises calculating the power reduction as a function of the second electrical parameter reaching the current allocation threshold.

9. The system of claim 8, wherein:
    a circuit protection device is communicatively connected to the controller; and
    the controller is further configured to engage the circuit protection device when the second electrical parameter exceeds the circuit protection threshold.

10. A method for allocating power to a load, the method comprising:
    detecting, by at least one sensor mounted on an electric aircraft, at least one electrical parameter of at least one energy source of an electric aircraft, wherein the at least one energy source is communicatively coupled to at least one load of a plurality of loads, wherein the at least one load comprises at least a portion of a propulsion system of the electric aircraft;
    receiving, at an aircraft controller which is communicatively connected to the at least one energy source, at least one electrical parameter of at least one energy source from the at least one sensor;
    determining, at the aircraft controller, a power demand for at least one load of the plurality of loads for a particular phase of flight as a function of the at least one electrical parameter;

calculating, at the aircraft controller, a power allocation threshold wherein the power allocation threshold is a function of a circuit protection threshold;

comparing, at the aircraft controller, the power demand to the power allocation threshold; and calculating, at the aircraft controller, a power reduction to the at least one load as a function of the comparison.

11. The method of claim 10, wherein the propulsions system of the electric aircraft comprises a plurality of propulsors.

12. The method of claim 11, further comprising determining, at the aircraft controller, a balance of the electric aircraft as a result of the power reduction to the at least a load.

13. The method of claim 10, further comprising:

calculating, at the aircraft controller, a remaining power for at least one energy source as a function of at leas tone electrical parameter of at least one energy source; and comparing, at the controller, the power demand to the remaining power, wherein calculating the power reduction further comprises calculating the power reduction as a function of comparing the power demand to the remaining power.

14. The method of claim 13, wherein the power demand and the remaining power each comprise a voltage value.

15. The method of claim 10, wherein the electrical parameter comprises a voltage level.

16. The method of claim 10, wherein detecting further comprises detecting, by at least one sensor, a second electrical parameter of at least a portion of the propulsion system of the electric aircraft.

17. The method of claim 16 further comprising:

receiving, at the aircraft controller, the second electrical parameter of at least a portion of the propulsion system of the electric aircraft;

comparing, at the aircraft controller, the second electrical parameter to at least a current allocation threshold, wherein the current allocation threshold is generated as a function of at least a circuit protection threshold of load; and detecting, at the aircraft controller, that the second electrical parameter has reached the current allocation threshold, wherein calculating the power reduction further comprises calculating the power reduction as a function of the second electrical parameter reaching the current allocation threshold.

18. The method of claim 17, further comprising uncoupling, by a circuit protection device, the at least one energy source of the electric aircraft from the at least one load when the second electrical parameter exceeds a threshold of the circuit protection device.

* * * * *